Jan. 9, 1962  H. L. ELY  3,015,870
QUICK RELEASE CAM TYPE FASTENER DEVICE
Filed March 26, 1958

INVENTOR.
Harley Lee Ely
BY
Wm. T. Wofford

United States Patent Office 3,015,870
Patented Jan. 9, 1962

3,015,870
QUICK RELEASE CAM TYPE FASTENER DEVICE
Harley Lee Ely, Fort Worth, Tex.
(508 Timberland St., Smyrna, Ga.)
Filed Mar. 26, 1958, Ser. No. 724,006
1 Claim. (Cl. 24—221)

My invention relates to fastener devices, and more particularly to quick release cam type fasteners.

A typical conventional fastener of a type widely used in the aircraft industry is made up of two complementary parts, namely a stud held in a first structure and a cam type retainer fixed to a second structure which is to be fastened to the first. The stud normally has a flat screw type head and a cam surface which is usually a transverse pin adjacent its outer end. To fasten the two structures, their adjacent faces are placed in mutual contact, and the stud, which is held in an opening in the first structure, is passed through an opening in the second structure over which the retainer is centered, and through a slot in the retainer, and is torqued on the retainer cam surface to the locked, or fastened position. Such conventional fasteners have a number of disadvantages and limitations. A different length fastener is required for each different joined structure thickness. It is necessary to apply considerable torque for both the lock and release action. The assembly when locked, has only cam tightness. The joined structures often are subject to slight lateral displacement in use, causing a mis-match of the holes through which the stud is passed, making it difficult and sometimes impossible to remove the stud without attendant damage when it is desired to separate the structures. When the fasteners are used on outer surfaces of aircraft, the tool slot or opening in the stud head adds to the drag on the aircraft.

It is accordingly a general object of my invention to provide an improved quick release fastener device wherein the limitations and disadvantages above mentioned are obviated.

Particularly, one object of my invention is to provide a quick release fastener wherein the joined structures may be readily separated even when there has been lateral displacement of the structures.

Another object of my invention is to provide a quick release fastener which can be effectively used over a range of structure thicknesses, thus greatly reducing the number of standard fastener lengths required to cover a given range of structure thicknesses.

Another object of my invention is to provide a quick release fastener wherein very little torque is required for either the locking or the unlocking operation.

Another object of my invention is to provide a quick release fastener wherein the tightness of the joint may be increased beyond cam tightness.

Another object of my invention is to provide a quick release fastener which presents a flush outer surface when in the locked position.

These and other objects are effected by my invention as will be apparent from the following description taken in accordance with the accompanying drawing, forming a part of this application, in which.

Figure 1:
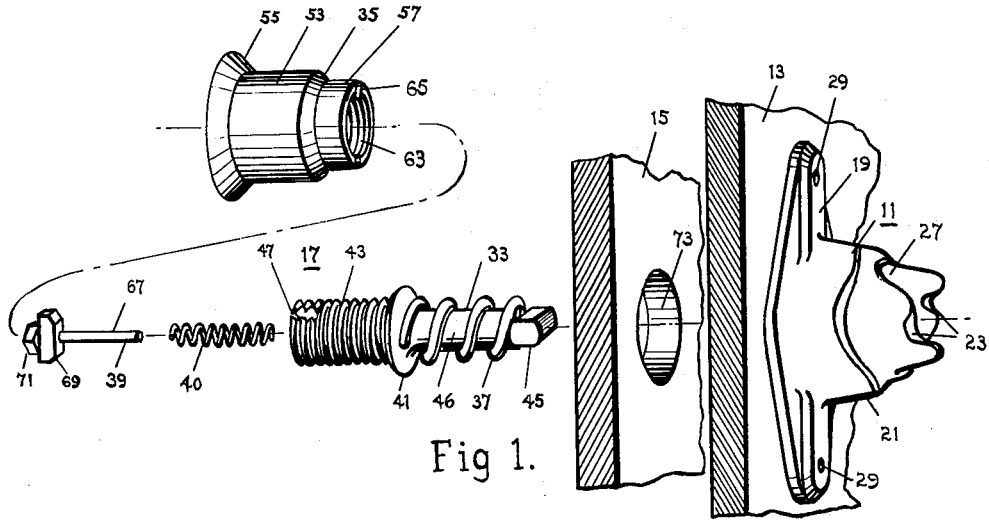
FIG. 1 is an exploded perspective view of a quick release fastener in accordance with a preferred embodiment of my invention.

Referring now to the drawing, there is shown a cam type retainer 11, first and second structures to be joined 13, 15, and a stud assembly 17. The cam type retainer 11 may be of a conventional type, having a base portion 19 and a crown portion 21 centered thereon, with cam surfaces 23 on the upper outer portion of the crown 21, with a generally bell shaped cavity 25 inside the crown 21, and a centrally disposed slot 27 communicating between the cavity 25 and the cam surface portion of the crown 21. The retainer 11 has its base 19 fixed by brads 29 or other suitable means, to the outer surface of the first structure 13, with the crown axis common with the central axis of a circular opening 31 in the structure 13. The stud assembly 17 includes a stud 33, a bearing nut 35, a stud ejection spring 37, a bearing nut closure pin 39, and a closure pin return spring 40. The stud 33 has an integral circular collar or flange 41 adjacent its center portion and is threaded at 43 from the collar 41 to one end, and has a T head cam 45 at the other end. The diameter of the threaded portion 43 is less than that of the collar 41. The stud portion 46 between the collar 41 and the T head 45 is cylindrical, and has a diameter less than that of the collar 41. The threaded end is provided with a transverse slot 47, which is adapted for receiving a cooperating part of the bearing nut closure pin 39. A cylindrical axial opening 49 extends inwardly from the bottom of the slot 47 and acts as a barrel to receive the nut closure pin return spring 40. The stud ejection spring 37, which is a conventional helical spring, is carried on the stud cylindrical portion 46, with one end bearing against the collar 41. The bearing nut is basically cylindrical, having an outer end and an inner end. The outer end face 51 of the bearing nut has a flat circular surface. The nut 35 tapers radially and axially inwardly from the outer end face 51 to a cylindrical bearing surface 53, thus providing a bevelled bearing surface 55. The cylindrical bearing surface 53 has a diameter equal to that of the circular opening 31 in the first structure 13 and length approximately equal to the combined thicknesses of the first and second structures 13, 15. The inner end portion of the bearing nut has a cylindrical surface 57 of diameter about the same as that of the stud collar 41. The outer end portion of the bearing nut 35 is provided with an axial hexagon shaped cavity 59 which is adapted for receiving a torqueing tool 61. An axial threaded opening 63 communicates with the hexagon cavity 59 and extends to the inner end of the nut 35. A diametral slot 65 extends the entire length of the threaded opening 63 and partway into the hexagon cavity 59. This slot 65 is adapted for cooperation with the part of the bearing nut closure pin 39, as will now be described. The end closure pin 39 has a cylindrical shank portion 67 of diameter less than that of the cylindrical opening 49 in the stud 33. Integral with one end of the closure pin shank 67 is a T head 69 which is adapted to be received by the slot 65 in the bearing nut 35 and also the slot 47 in the threaded end 43 of the stud 33. The T head 69 is capped with an integral hexagonal head 71 which is adapted to be received by the hexagonal opening 59 at the outer end portion of the bearing nut 35. The closure pin return spring 40 is of a conventional helical type, and is carried on the shank 67 of the pin 39 with one end bearing on the pin T head 69 and the other end bearing on the bottom of the cylindrical opening 49 in the stud 33. The second structure 15 is provided with a circular opening 73 of the same diameter as the opening in the first structure, but is bevelled at its outer end 75 to match the corresponding bevel 55 on the bearing nut 35. To assemble the stud assembly 17, the closure pin return spring 40 is placed on the pin shank 67 and then the pin 39 is inserted in the bearing nut 35 with T head 69 in the bearing nut slot 65. Then the return spring 40 is placed in the stud cylindrical opening 49, and the stud 33 is threaded part way into the bearing nut 35.

Figure 2:
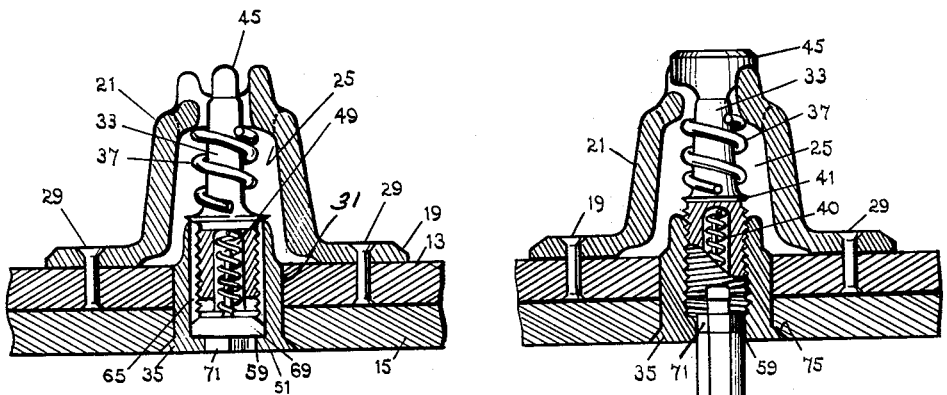
FIG. 2 is a side elevational section view, showing the quick release fastener of FIG. 1 in the assembled and locked position.
Figure 3:
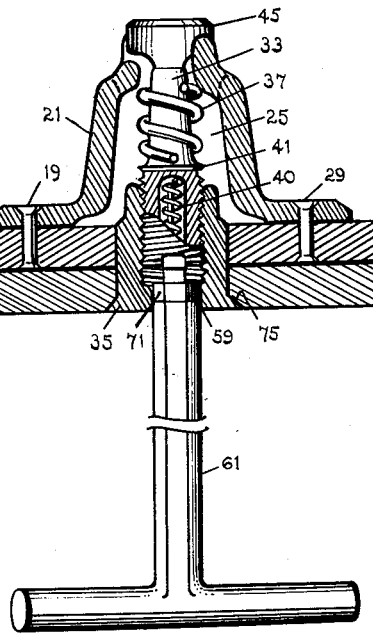
FIG. 3 is a section view like that of FIG. 2, but showing the fastener in the process of being unlocked.

To operate the fastener, the openings 31, 73 in the structures to be joined are aligned and the stud assembly 17 is inserted in the openings from the second structure side. Then the torqueing tool 61 is inserted in the bearing nut hexagonal opening 59, pushing the closure pin 39 to its extreme inward position, which is the camming position. In the camming position, the closure pin T head 69 is engaged with the stud slot 47, while the torqueing tool 61 is engaged with the hexagonal opening 59 in the bearing nut 35, which means that the stud 33 and the bearing nut 35 must turn together. The torqueing tool 61 is now rotated to cam the T head 45 of the stud 33 into locking position on the cam surfaces 23 of the retainer 11. Next, the torqueing tool 61 is withdrawn slightly, allowing the return spring 40 to move the closure pin 39 outward until its T head 69 is retracted fully out of the stud slot 47, so that the bearing nut may be rotated independently of the stud 33. The torqueing tool 61 is again rotated to advance the bearing nut 35 on the stud threads 43, thus shortening the total stud-bearing nut length, and drawing the structures 13, 15 into firm pressure contact at their adjacent faces. Now the torqueing tool 61 is removed, and the return spring 40 moves the closure pin 39 to its extreme outward position so that its hexagonal head 71 is flush with the bearing nut outer face 51, which is in turn flush with the outer surface of the second structure 15. The entire fastener and structure assembly is shown in the fully locked position in FIG. 2 of the drawing. To release the fastener device, the locking procedure is simply reversed. Since the total length of the stud-bearing nut assembly is variable, it can readily be made sufficiently long for easy camming both into the locking and the unlocking positions. This means that the locking and unlocking operations can be accomplished without stress or strain on the parts. Also, the structures to be joined can be held together much more tightly than would be possible with simple camming action alone. In case the structures 13, 15 tend to bind the bearing nut 35 due to lateral displacement, the fastener can still be released by simply backing the bearing nut off the stud 33. The stud ejection spring 37, which bears at one end of the surface of the retainer cavity, will tend to eject the stud assembly 17 and also limit movement of the stud 33 in the non-ejecting direction. Also, because the total stud-bearing nut length, is variable, fewer standard sizes are required to cover a given range of structure thicknesses.

The closure pin arrangement as herein shown and described, provides a flush outer surface for the second structure. This can be quite important where fasteners are used on outer surfaces of high speed aircraft.

It is realized that the specific form of the fastener shown and described can be modified in various ways as will occur to those skilled in the art, without departing from the scope of my invention. In cases where a flush surface is not an important consideration, the closure pin 39 and its return spring 40 may be eliminated, and the slot 65 could be extended all the way through the bearing nut. Of course, shapes other than slots or hexagonal openings may be used, and the shaped of the torqueing tool may be chosen accordingly. If desired, a conventional type retainer ring may be added to prevent the stud assembly from dropping out of the second structure when unlocked.

While I have shown my invention in only one form, it will be obvious to those skilled in the art that it is not so limited, but is susceptible of various changes and modifications without departing from the spirit thereof.

I claim:

A fastener device comprising: a cam type retainer having a base portion, a crown portion integral with said base portion, said crown portion having cam surfaces at its outer end portion; said retainer being adapted for fixing to the outer face of a first structure having an opening therein, with said crown centered over said opening; a stud assembly comprising a stud, a helical stud ejection spring, a bearing nut, a closure pin, and a helical closure pin return spring; said stud having an integral collar intermediate its ends and a T head cam at one end and having external threads extending from said collar to the other end, an integral shank portion extending from said collar to said head, a diametral slot extending inwardly into said stud at its threaded end, and a cylindrical axial bore extending into said stud from the bottom of said slot, with said ejection spring carried on said shank; said bearing nut having an axial opening including a portion adjacent the nut head end having polygonal sides, and a portion having internal threads and a diametral slot extending to the said portion having the polygonal sided opening, with said internal threads being adapted for cooperation with said stud threads, said bearing nut having an outer cylindrical surface adapted for fitting said first structure opening and also an opening in a second structure to be joined to the first, said bearing nut having a flat head which is flush with the outer surface of the second structure when the device is in the locked position; said pin having a cylindrical shank portion capped with an integral T head which is in turn capped with an integral polygonal head, with said T head being adapted for sliding in said bearing nut and stud slots, and said polygonal head adapted to fill the polygonal opening in said bearing nut, with said return spring being carried by said shank and inserted in said stud bore, so that said polygonal head outer surface is normally flush with said bearing nut head outer surface.

References Cited in the file of this patent

UNITED STATES PATENTS

| | | |
|---|---|---|
| 2,369,297 | Johnson | Feb. 13, 1945 |
| 2,555,197 | Lasky | May 29, 1951 |
| 2,763,908 | Marschner | Sept. 25, 1956 |

FOREIGN PATENTS

| | | |
|---|---|---|
| 542,028 | Great Britain | Dec. 23, 1941 |
| 870,757 | France | Dec. 22, 1941 |